Figure 12:
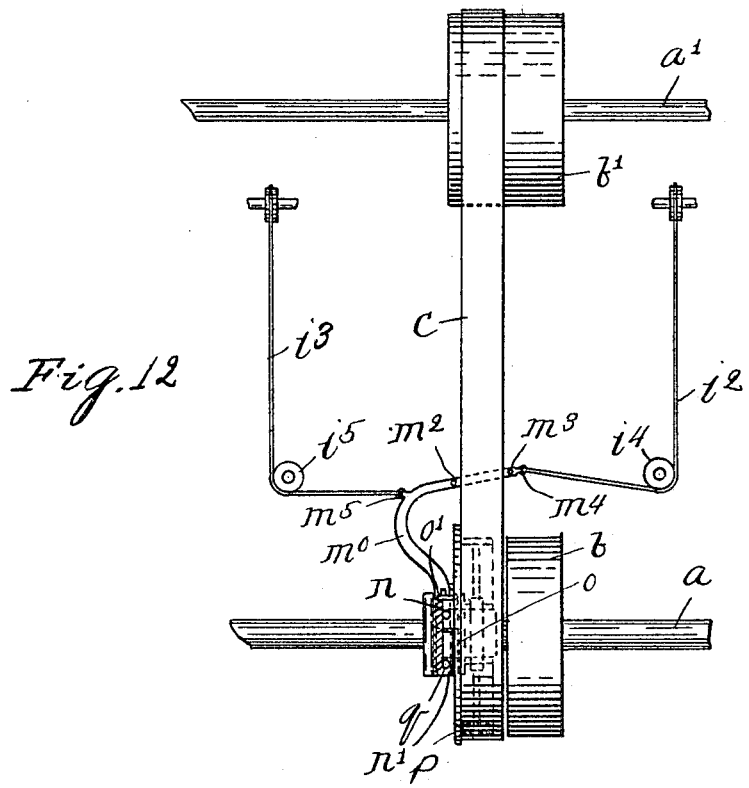

No. 818,654. PATENTED APR. 24, 1906.
S. R. BAILEY.
BELT SHIFTER.
APPLICATION FILED FEB. 6, 1905.
6 SHEETS—SHEET 1.
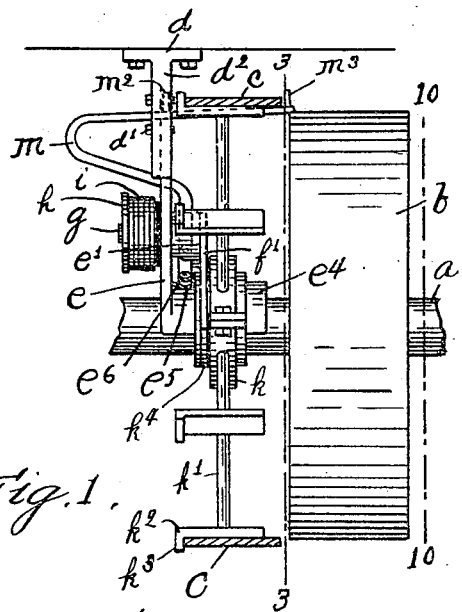
Fig. 1.
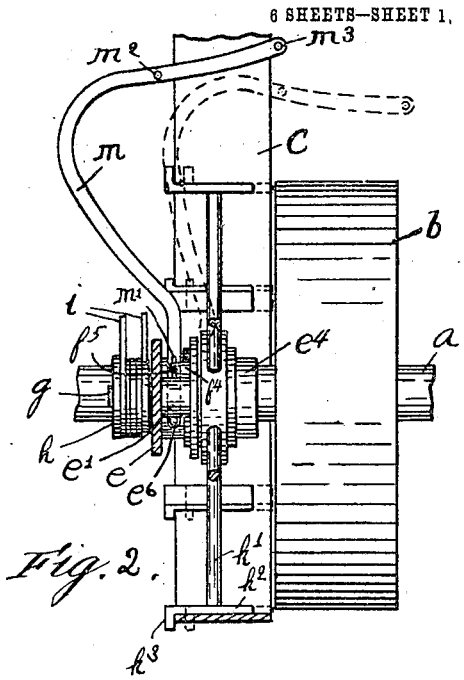
Fig. 2.
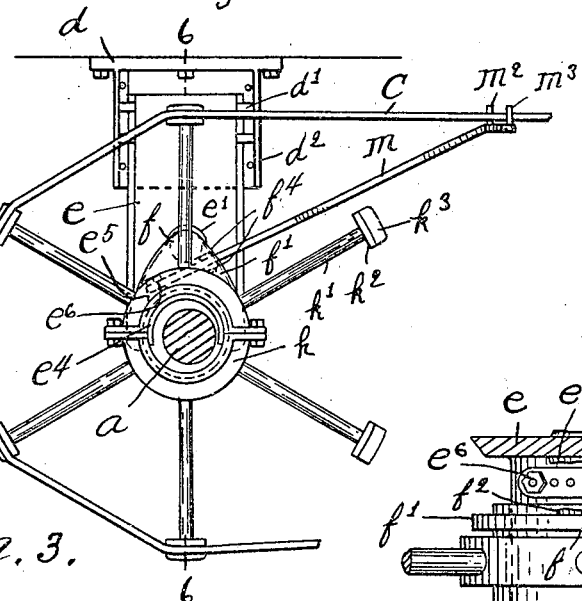
Fig. 3.
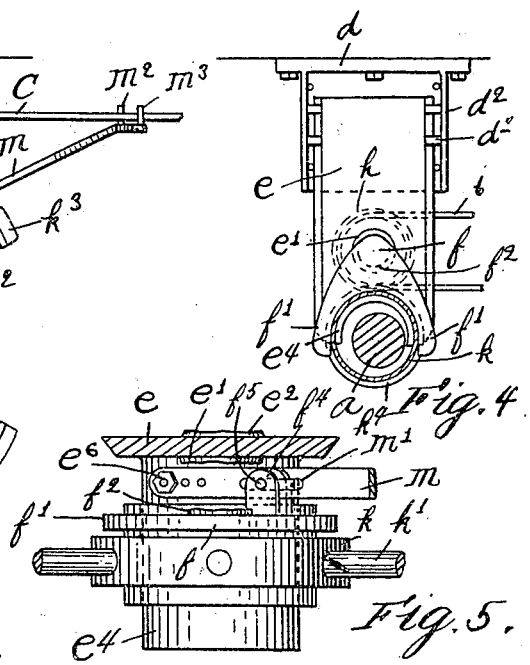
Fig. 4.
Fig. 5.
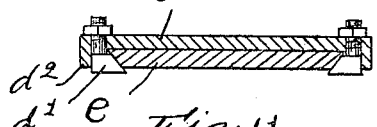
Fig. 11.
Witnesses:
H. B. Davis
Maud M. Piper
Inventor:
Saml. R. Bailey
by Rogers & Hammar
attys.

No. 818,654. PATENTED APR. 24, 1906.
S. R. BAILEY.
BELT SHIFTER.
APPLICATION FILED FEB. 6, 1905.
6 SHEETS—SHEET 2.
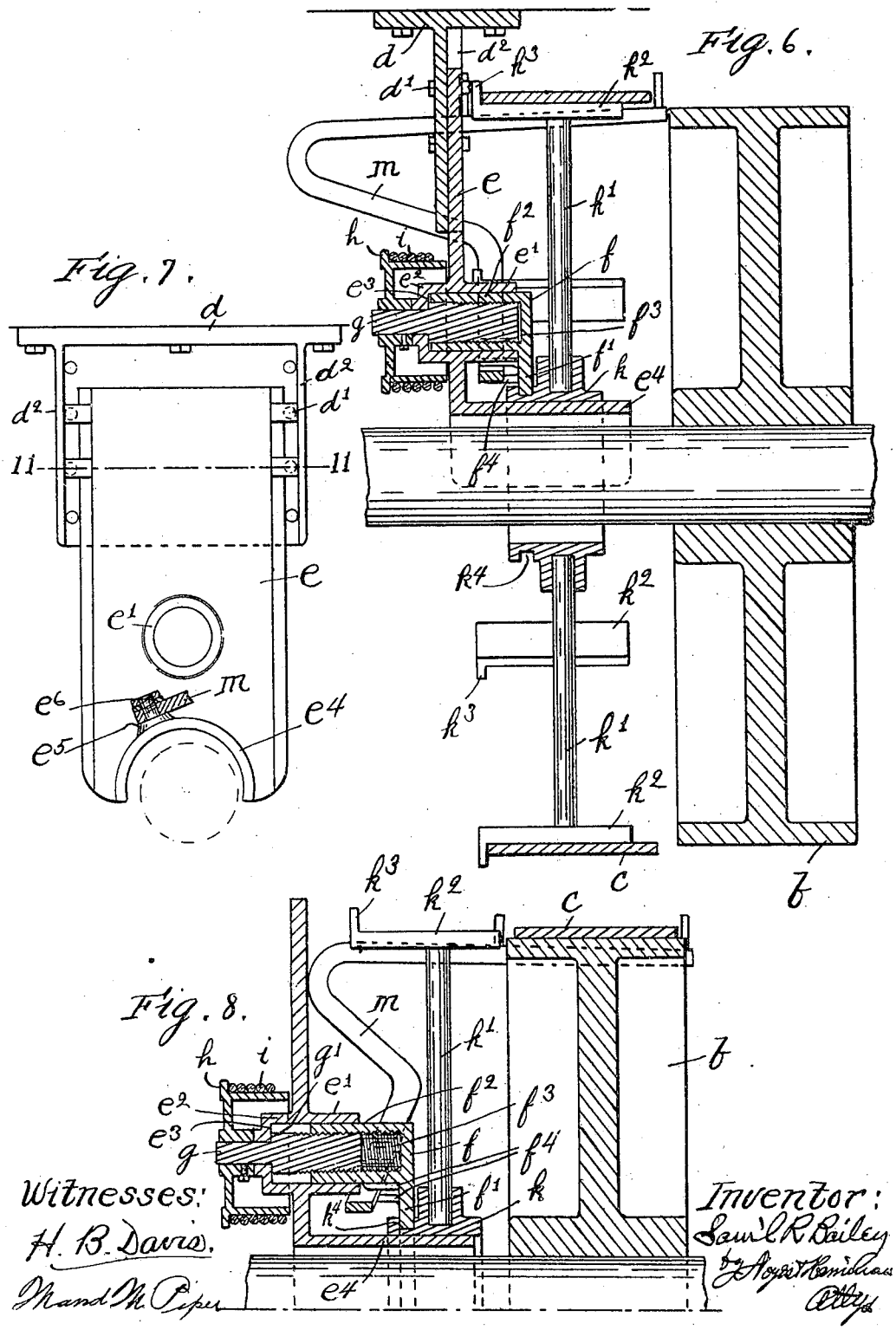
Witnesses:
H. B. Davis.
Inventor:
Sam'l R Bailey

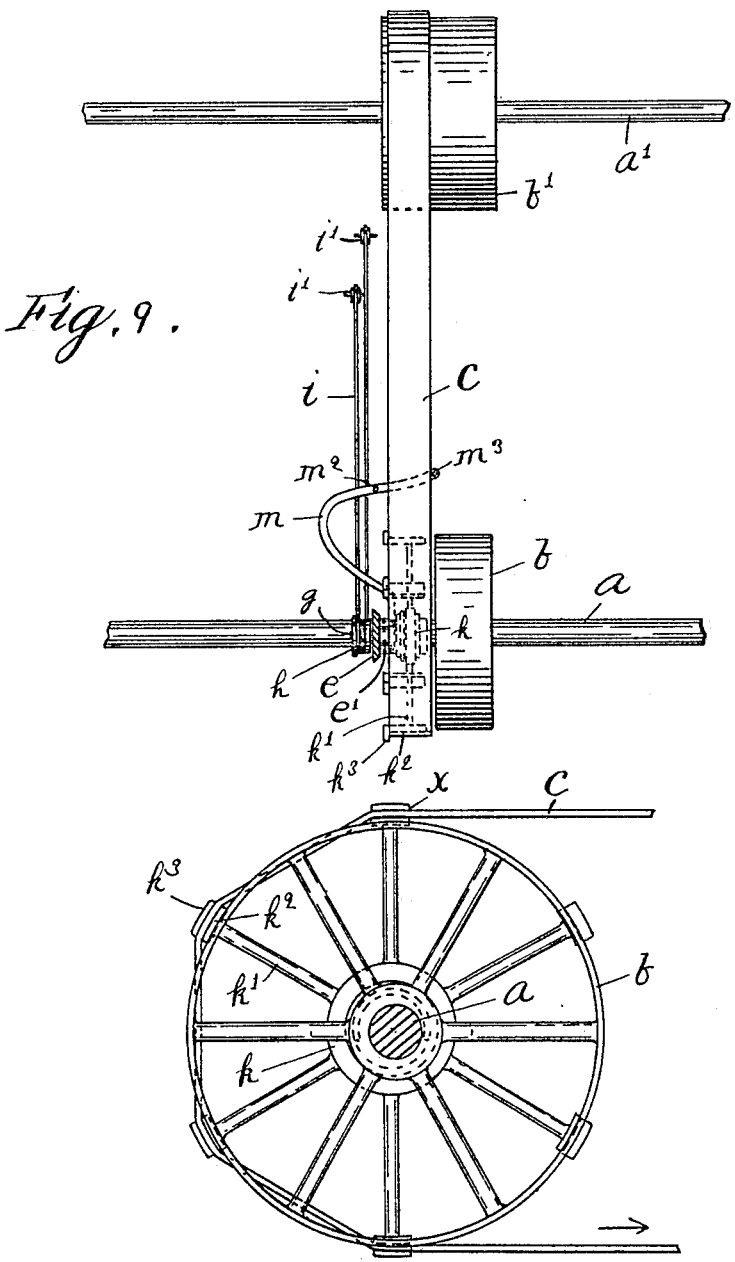

No. 818,654. PATENTED APR. 24, 1906.
S. R. BAILEY.
BELT SHIFTER.
APPLICATION FILED FEB. 6, 1905.

6 SHEETS—SHEET 4.

Witnesses:
H. B. Davis
Maud M. Piper

Inventor:
Sam'l R. Bailey
by Noyes & Harrison
Atty's

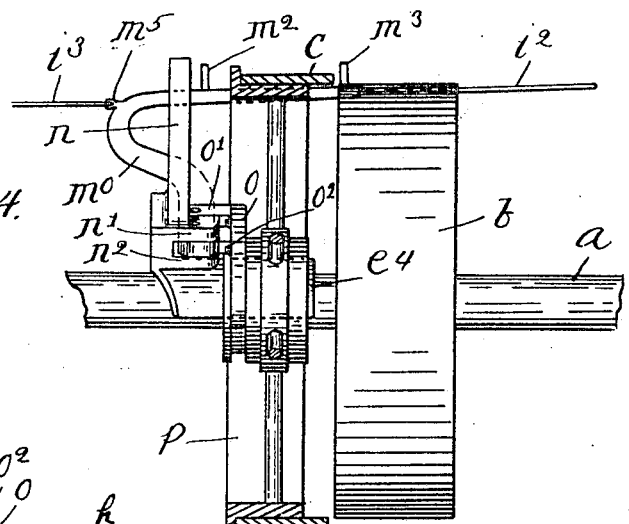
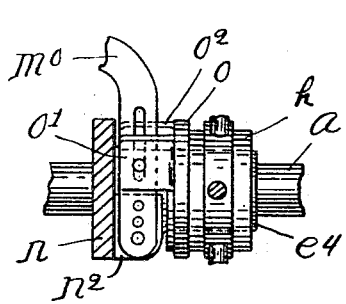
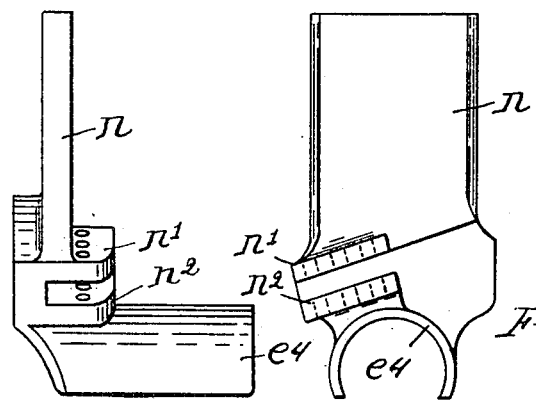
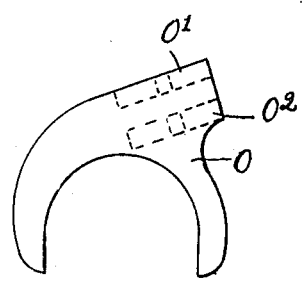

No. 818,654. PATENTED APR. 24, 1906.
S. R. BAILEY.
BELT SHIFTER.
APPLICATION FILED FEB. 6, 1905.

6 SHEETS—SHEET 6.

Witnesses:
H. B. Davis.
Maud M. Piper

Inventor:
Sam'l R. Bailey
by Noyes & Kenman
Att'ys

UNITED STATES PATENT OFFICE.

SAMUEL R. BAILEY, OF AMESBURY, MASSACHUSETTS.

BELT-SHIFTER.

No. 818,654.  Specification of Letters Patent.  Patented April 24, 1906.

Application filed February 6, 1905. Serial No. 244,341.

*To all whom it may concern:*

Be it known that I, SAMUEL R. BAILEY, a resident of Amesbury, county of Essex, State of Massachusetts, have invented an Improvement in Belt-Shifters, of which the following description, in connection with the accompanying drawings, is a specification, like characters on the drawings representing like parts.

This invention relates to that class of belt-shifting devices in which a counter-shaft is disconnected from the main shaft by shifting the belt from the fast pulley thereon to a belt-holder or loose pulley which is journaled upon a bearing supported independently of the main shaft, so that loss of power and loss by wear are prevented during the time in which it is unnecessary that the counter-shaft be driven. In devices of this character it has been practically necessary to employ a clutch device between the fast and loose pulleys, so that the loose pulley may be rotated and the belt may be run from the loose onto the fast pulley with an ordinary shipper. I have found in practice that this method is open to several vital objections, particularly where the main shaft runs at a high rate of speed, as the clutch mechanism often fails to work properly and often, moreover, can only be operated with difficulty. In most instances the main shaft is located at some distance from the counter-shaft, which is usually located over the machine which it drives, and I have found in practice that the ordinary workman will not usually take the trouble to shift the belt from the fast pulley to the normally stationary belt-holder, if it is necessary for him to leave his machine to do so and if there is a shipper mechanism on the counter-shaft which he may more conveniently employ to stop his machine. As such shipper mechanism is practically a necessity with said prior devices, the very purpose for which they are intended is defeated by non-use.

The principal object of my invention is to provide a device of the character above referred to which may be operated at a considerable distance from the main shaft with the readiness of the ordinary shipper mechanism on a counter-shaft, so that the belt may be thrown onto the fast pulley of the main shaft to start the counter-shaft or the machine directly driven thereby and onto the independently-supported belt-holder to stop the same, thereby avoiding the employment of a shipper mechanism on the counter-shaft, including the usual loose pulley, and preventing the loss of any power between the machine and the main shaft while the machine is not in use.

A further object is to provide belt-transferring means whereby preliminary rotation of the loose pulley or belt-holder before the belt is transferred therefrom is rendered unnecessary.

I accomplish these objects by the means shown in the accompanying drawings, in which—

Figure 13:
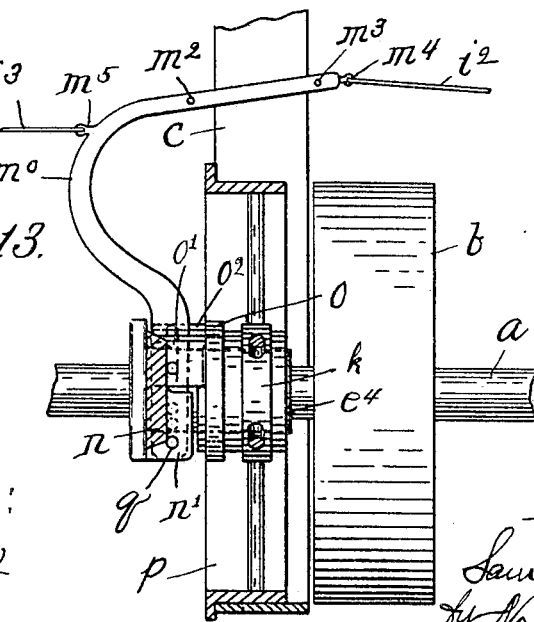
Figure 19:
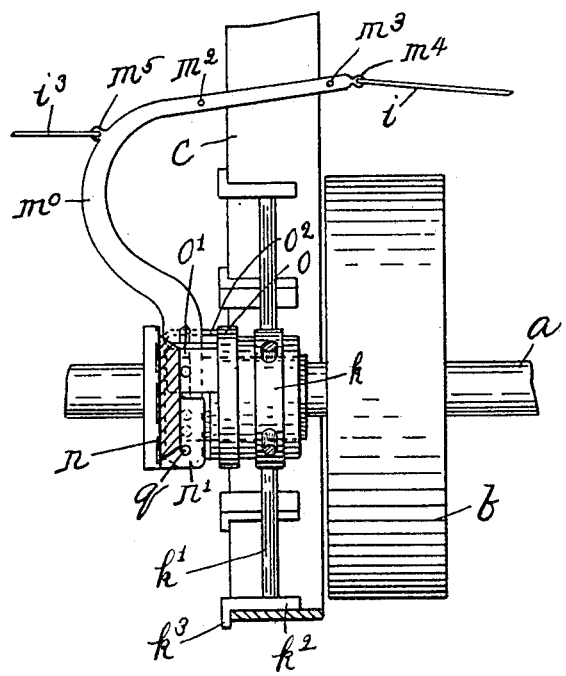

Figure 1 is a side elevation of a loose-pulley device made according to my invention. Fig. 2 is a top plan view thereof. Fig. 3 is a cross-sectional view on the line 3 3 of Fig. 1. Fig. 4 is a detail end view of the loose-pulley operating-dog. Fig. 5 is a detail plan view of the loose-pulley hub and shipper-lever. Fig. 6 is a sectional view on the line 6 6 of Fig. 3. Fig. 7 is a detail view of the front of the hanger. Fig. 8 is a view similar to Fig. 6, showing the parts in a different position. Fig. 9 is a plan view of the main shaft and connections to the counter-shaft. Fig. 10 is a cross-section on line 10 10 of Fig. 1. Fig. 11 is a section on line 11 11 of Fig. 7. Fig. 12 is a plan view of the main shaft and connections with the counter-shaft of a somewhat-modified form of my invention. Fig. 13 is an enlarged plan view, and Fig. 14 is a side elevation, partly in section, of said form. Fig. 15 is a detail view of the lever connection. Figs. 16 and 17 are detail side and front views of the hanger-arm. Fig. 18 is a detail view of the fork employed in connection with said modified form. Fig. 19 is a plan view, partly in section, of the preferred form of my invention.

The main shaft $a$ has a fast pulley $b$ mounted thereon, about which the belt $c$ is adapted to run, said belt $c$ also passing over a pulley $b'$ on a counter-shaft $a'$ in the usual manner. The pulley $b'$ is preferably twice the width of the belt. The hanger-base $d$ is secured to a fixed support, and an arm $e$ is adjustably secured to said base, said arm preferably comprising a flat plate having beveled edges and being secured to the base of the hanger by means of bolts $d'$, having wedge-shaped heads and passing through suitable apertures in the base $d$ close to a rib $d^2$ formed on each side thereof, so that as the bolts are tightened by means of nuts on the rear side of the hanger-base the bolt-heads will become firmly wedged between the beveled edges of the hanger-arm $e$ and said ribs $d^2$, firmly clamping said arm to said base and permitting the arm to be adjusted vertically and horizontally within certain limits. The arm $e$ of the hanger is provided with a boss $e'$ on its front side and a boss $e^2$ on its rear side disposed in line and longitudinally bored to form a bearing, the diameter of the bore at the outer end of the boss $e^2$ being reduced to form a shoulder $e^3$ and a bearing for the smaller end of a stud or shaft $g$.

A fork $f$, having diverging arms $f'$, is provided with a cylindrical projection $f^2$, which extends at right angles to the plane of said arms, said projection being fitted in the larger end of the bore of bosses $e'$ $e^2$. Said projection $f^2$ is internally bored from its inner end to within a short distance of its outer end, forming a chamber $f^3$, said chamber preferably being counterbored for a short distance from its open end to provide an additional bearing for a portion of the shaft $g$, which is located therein, and said shaft and the walls of said chamber are provided with engaging screw-threads. A shoulder $g'$ on shaft $g$ engages the shoulder $e^3$, and a sheave $h$ is secured to the outer or smaller end of the shaft $g$, the hub of said sheave engaging the outer end of boss $e^2$, so that a swivel connection is provided between said shaft and hanger-arm $e$. A cord or cable $i$ is passed a suitable number of times about said sheave and conducted over pulleys $i'$ to a point adjacent the counter-shaft $a'$ or the machine which is driven thereby.

Formed integral with the arm $e$ is a hollow semicylindrical bearing $e^4$, which extends horizontally from the lower end of said arm, adjacent to but out of contact with the main shaft. The hub $k$ of a loose pulley or circular belt-holder is journaled on the bearing $e^4$, and a series of radial arms $k'$ are connected to said hub. Each of said arms is provided with a belt-holding bar $k^2$ at its outer end, said bars being circularly arranged with relation to the axis of the hub—that is, the faces of said bars are segments of a cylinder having said axis as a center. The ends of said bars $k^2$ next the hanger are provided with radially-projecting flanges $k^3$, circularly arranged with relation to the axis of the hub, and the distance from the side of said flanges $k^3$ next the fast pulley to the opposite end of the belt-holding faces of said bars $k^2$ is materially less than the width of the belt, so that the belt always projects transversely beyond the edge of the belt-holder next the fast pulley under all conditions of starting or stopping or whenever the belt touches the holder at all. An annular groove $k^4$ is formed in the hub $k$ on the side thereof next the hanger, and the arms of the fork $f$ are fitted in said groove, so that the fork rides on said hub.

A shipper-lever $m$ is adustably pivoted at one end to a boss $e^5$, formed integral with the arm $e$, by means of a pivot-pin $e^6$ (see Figs. 3 and 5) and extends obliquely upward at an angle of about forty-five degrees from the horizontal between lugs $f^4$, formed integral with fork $f$. A pin $f^5$ is secured in said lugs and passes through a slot $m'$, formed in said lever, so that as the fork $f$ is moved to and from the hanger the free or upper end of said lever will be swung in the same direction. As shown in Fig. 2, the lower portion of lever $m$ is straight, and as it extends upward it also extends obliquely away from the holder $f$ a distance approximately the same as the width of the belt $c$, and then it curves back in the opposite direction and extends nearly straight and horizontally and nearly at right angles to its lower end portion in front of the face of the belt-holder beneath the belt. Said straight portion at the free end of said lever is provided with two upwardly-extending arms or fingers $m^2$ $m^3$, which are respectively adapted to be located adjacent opposite edges of the belt $c$ in all positions thereof.

As shown in Fig. 10, the diameter of the belt-holder, or the distance between opposite belt-supporting faces of the bars $k^2$, is somewhat greater than the diameter of the fast pulley $b$. The hanger-arm $e$ is also preferably so adjusted that the axis of the belt-holder is slightly eccentric to the axis of the pulley and adjacent or on the bisecting line of the ninety-degree sector wrapped by the belt as it leads onto the pulley. In this position of the belt-holder its belt-engaging faces move a short distance beyond the periphery of the fast pulley, adjacent nearly the entire portion thereof which is wrapped by the belt.

The operation of the above-described device is as follows: Assuming that the belt is supported on the belt-holder, as shown in Figs. 1, 2, 3, 6, and 9, so that they are totally disconnected from the main shaft, and therefore are stationary, if it is desired to throw the belt onto the pulley $b$ one of the cords $i$ will be pulled to cause the shaft $g$ to rotate in a direction to move the fork $f$ toward the pulley $b$. This movement causes the hub $k$ of the belt-holder to be slid along on the bearing $e^4$ in the same direction and forces the portion of the belt $c$ which projects beyond the faces of the bars $k^2$ next the fast pulley $b$ against or onto the adjacent edge portion of the latter. As each arm $k'$ of the belt-holder moves to a position in which it is perpendicular to the belt at the point at which it leads onto the bar $k^2$, supported thereby, the belt is lifted above the edge of the pulley, as shown at $x$ in Fig. 10, so that it will immediately begin to run onto the face of the pulley to the normal extent circumferentially and will at once begin to travel at practically the same speed as the fast pulley. If the pulley $b$ is crowned, the belt will then run from the holder to the center of the pulley without assistance, provided it is free to do so. If the pulley $b$ is not crowned, as shown, means must be and preferably are provided in all instances for forcing the belt to run to the middle of the pulley. As the belt-holder and the fork $f$ are forced toward the pulley the free end of the lever will be swung by said fork in the same direction, only at a much greater speed, according to the relative positions of pivots $e^6$ and $f^5$ and the distance therefrom to the fingers or arms $m^2$ $m^3$, so that the finger $m^2$ will be pressed against the farther edge of the belt from the pulley at the instant its opposite overhanging or projecting edge portion begins to run onto the pulley, as above described, and as the holder is moved on toward the pulley the lever will cause the belt to run rapidly to the middle of the pulley, the belt being carried to the desired position by the time the ends of the bars $k^2$ are carried close to the edge of the pulley, as shown in Fig. 8. As soon as the belt begins to run onto the fast pulley and its edge is fairly engaged by the finger $m^2$ it will be moved out of contact with the flanges $k^3$, the latter being effective in pressing all portions of the belt which wrap the holder at one time onto the fast pulley simultaneously at the beginning of the operation. However, under ordinary conditions and inasmuch as both the belt and belt-holder are "dead" before the belt is carried into contact with the fast pulley the frictional contact between the belt and the holder is so great that it is practically impossible to move the belt transversely on the holder while it is stationary until it begins to run onto and only so fast as it actually does run onto the fast pulley—that is, a shipper-fork or similar device would of itself be absolutely ineffective in moving the stationary belt into engagement with the fast pulley, as it would first be necessary to drive the belt and belt-holder in the same direction as that in which the main shaft is turning or to move the holder bodily, as is done by me. The movement of the holder bodily to carry the belt transversely toward the fast pulley would of itself be ineffective if a sufficient portion of the belt did not overhang or project beyond the edge of the holder adjacent the pulley to enable a substantial portion of the belt to run onto the pulley before the end of the movement of the holder toward the pulley was reached. In transferring the belt back to the belt-holder the cord $i$ is pulled to rotate the sheave $h$ and shaft $g$ in the opposite direction, thereby drawing the belt-holder away from the pulley and causing the finger $m^3$ at the extreme end of the shipper-arm to move back toward the hanger, so that it will engage the adjacent edge of the belt and cause it to run from the pulley $b$ onto the belt-holder. While this movement is taking place the belt-holder is being moved away from the fast pulley, and by the time the belt has been carried out of contact therewith it will have been carried completely onto the belt-holder, the latter rotating until the momentum of the belt and counter-shaft has been spent. It is at the latter part of this operation that the edge flanges $k^3$ of the holder perform their principal function, for if means were not provided for stopping the movement of the belt away from the fast pulley in a position in which a portion thereof overhung the space between the holder and pulley the rotation of the holder after the belt had left the pulley caused by its momentum and the momentum of the belt and counter-shaft would be liable to cause the belt to run transversely on the holder so far that no portion thereof would overhang said space. However, the flanges $k^3$ act as stops and effectively prevent movement of the belt away from the pulley beyond a position in which it will not overhang. The shipper-fork may be made to control to an extent the dead position of the belt; but it is uncertain in its action, so that a more effective stop must be provided.

In Figs. 12 to 18 I illustrate a somewhat-simplified form of my invention. With this arrangement the screw-threaded shaft $g$ is omitted and a cord $i^2$ is connected to an eye-lug $m^4$ at the extreme end of the straight portion of the shipper-lever $m^0$, which bears the belt-engaging arms $m^2$ $m^3$, and a cord $i^3$ is connected to an eye-lug $m^5$, formed on said lever at the opposite end of said straight portion, as shown in Fig. 13. The cords $i^2$ and $i^3$ may pass about suitable pulleys $i^4$ and $i^5$ to a point desired, so that by pulling on the cord $i^2$ the lever may be swung in the direction to throw the belt onto the fast pulley, and when the cord $i^3$ is pulled the lever may be swung in the opposite direction to transfer the belt from the fast pulley to the belt-holder. The lever is pivoted to the hanger-arm $n$ and to the fork $o$ in substantially the manner before described, except that it is desirable that the lever be more closely guided than is necessary with said previously-described construction. As shown in Figs. 14, 16, and 17, hanger-arm $n$ is provided with obliquely-disposed lugs $n'$ $n^2$, between which the lower end of the shipper-lever $m^0$ is fitted and to which it is pivotally connected by a pivot-bolt $q$, a series of bolt-holes being preferably provided in said lugs and said lever, so that the swing of the lever's belt-engaging end may be varied with relation to the movement of the fork $o$ according to requirements. The fork $o$ is fitted to ride in a groove in the hub of the belt-holder or loose pulley $p$ and is provided with lugs $o'$ $o^2$, between which the shipper-lever is fitted and pivoted, as before described. It will be apparent that when the shipper-lever is drawn over in front of the fast pulley the lever forces the fork, and consequently the belt-holder $p$, in the same direction simultaneously. When the lever is drawn in the other direction, the reverse operation obviously takes place. With this arrangement the belt may be shifted more rapidly than with that first described and as rapidly as if the belt were running at full speed and an ordinary shipper were applied thereto to cause it to run from one pulley to the other. It may also be shifted with much less effort than with the other construction, as the pull on the cords is applied almost directly to the belt. A further advantage of this arrangement resides in the fact that the force which actuates the fork to move the belt-holder toward and from the fast pulley may be applied as closely as possible to the bearing on the hanger, so that there is practically almost no tendency to cause the parts to bind in their operation.

The preferred form of my invention is shown as assembled in Fig. 19; but the advantages to be secured by using the same may be secured to a large extent by means not identical to those therein shown. For example, a continuous-faced idle pulley or belt-holder $p$, as shown in Figs. 12 to 14, may be employed, which is concentric with and has the same diameter as the fast pulley and which may satisfactorily perform the function of the eccentrically-mounted belt-holder $h$, having the series of belt-engaging faces; yet I prefer the latter construction, as it lifts or draws the belt away from the face of the fast pulley at the point at which the belt leads thereon without taking up the belt or stretching it any more than when it is on the fast pulley. With this form of idler, moreover, there is no air suction between the belt and belt-holding pulley when the belt is being transferred to the fast pulley as there would be if the belt-holding face were continuous.

From the foregoing description it will be evident that my device is well adapted for use as the ordinary belt-shifter of a machine and is equally well suited for use in any place where it is desirable to disconnect a countershaft from a main shaft at intervals.

Having thus described my invention, what I claim as new, and desire to secure by Letters Patent, is—

1. In combination with a fast pulley and a belt driven thereby, a belt-holder at one side of said pulley having a belt-supporting portion of less width than the belt, means for holding the belt on the belt-holder with its edge portion projecting therefrom when out of engagement with the pulley, and means for moving the holder toward the pulley, substantially as described.

2. In combination with a fast pulley and a belt driven thereby, an axially-movable belt-holder at one side of said pulley, and means for holding the belt on the belt-holder with its edge portion projecting therefrom when out of engagement with the pulley, comprising a stop disposed to limit the movement of the belt onto the holder at a position in which its belt-supporting portion is of less width than the belt, substantially as described.

3. In combination with a fast pulley and a belt driven thereby, a belt-holder at one side of said pulley, means for holding the belt on the belt-holder with its edge portion projecting therefrom when out of engagement with the pulley, comprising a stop disposed to limit the movement of the belt onto the holder at a position in which its belt-supporting portion is of less width than the belt, and means for moving said stop and holder toward the pulley, substantially as described.

4. In combination with a fast pulley and a belt driven thereby, a belt-holder at one side of said pulley, means for holding the belt on the belt-holder with its edge portion projecting therefrom when out of engagement with the pulley, comprising a stop disposed to limit the movement of the belt onto the holder at a position in which its belt-supporting portion is of less width than the belt, and means for moving said stop and holder toward the pulley simultaneously, substantially as described.

5. In combination with a fast pulley and a belt driven thereby, an axially-movable belt-holder at one side of said pulley, and means for holding the belt on the belt-holder with its edge portion projecting therefrom when out of engagement with the pulley, comprising a stop connected to said holder and movable therewith axially, said stop being disposed to limit the movement of the belt onto the holder at a position in which its belt-supporting portion is of less width than the belt, substantially as described.

6. In combination with a fast pulley and a belt driven thereby, a belt-holder at one side of said pulley having a belt-supporting face of less width than the belt, and means for holding the belt thereon with its edge portion projecting therefrom when out of engagement with the pulley, and means for moving the holder toward the pulley, substantially as described.

7. In combination with a fast pulley and a belt driven thereby, a belt-holder at one side of said pulley, having a belt-supporting portion of less width than the belt, means for holding the belt on the belt-holder with its edge portion projecting therefrom when out of engagement with the pulley, a belt-shifting arm adapted to engage the belt and means for moving said holder and arm simultaneously toward and from the pulley, substantially as described.

8. In combination with a fast pulley and a belt driven thereby, a circular belt-holder journaled at one side of said pulley having a flange projecting from its belt-supporting face at a distance from the edge thereof next the pulley less than the width of the belt, and means for holding said holder in a remote position from the pulley with the edge portion of the belt projecting therefrom out of contact with the pulley, and means for moving the holder toward the pulley, substantially as described.

9. In combination with the shaft having a fast pulley thereon, a circular belt-holder journaled at one side of said pulley, comprising a series of arms having a corresponding series of circularly-arranged, independent, belt-supporting faces at their ends, the diameter of the path of movement of said belt-supporting faces being greater than the diameter of the pulley at the portion of its face adjacent said belt-holder, and means for axially moving said belt-holder with relation to said pulley, substantially as described.

10. In combination with a shaft having a fast pulley thereon, a belt adapted to pass about said pulley, a hanger, a belt-holder journaled and axially movable on said hanger at one side of said pulley, a fork engaging said holder, a lever pivotally connected adjacent one end to said hanger and to said fork, respectively, at different points longitudinally thereof, and means at the opposite end of said lever for engaging the belt at its edge, substantially as described.

11. In combination with a main shaft having a fast pulley thereon, and a belt adapted to pass about said pulley, a transversely-movable, circular belt-holder journaled at one side of said pulley, a belt-shifting lever having a fixed pivot adjacent one end and means at the other end for engaging the belt, means connecting said belt-holder and said lever adjacent said pivot, whereby movement of said lever to shift the belt causes corresponding movement of the belt-holder, and operating means connected to the belt-engaging end of said lever for moving it in either direction to shift the belt, substantially as described.

In testimony whereof I have signed my name to this specification in the presence of two subscribing witnesses.

SAMUEL R. BAILEY.

Witnesses:
L. H. HARRIMAN,
H. B. DAVIS.